US009696474B2

(12) United States Patent
Nam et al.

(10) Patent No.: US 9,696,474 B2
(45) Date of Patent: Jul. 4, 2017

(54) POLARIZER AND DISPLAY PANEL HAVING THE SAME

(71) Applicant: Samsung Display Co., Ltd., Yongin (KR)

(72) Inventors: Jung-Gun Nam, Suwon-si (KR); Eun-Jung Kim, Suwon-si (KR); Dae-Young Lee, Seoul (KR); Dae-Hwan Jang, Seoul (KR); Gug-Rae Jo, Asan-si (KR); Kang-Soo Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/734,738

(22) Filed: Jun. 9, 2015

(65) Prior Publication Data

US 2016/0026034 A1   Jan. 28, 2016

(30) Foreign Application Priority Data

Jul. 28, 2014 (KR) ........................ 10-2014-0095963

(51) Int. Cl.
*G02F 1/1335* (2006.01)
*G02B 5/30* (2006.01)
*G02B 5/20* (2006.01)

(52) U.S. Cl.
CPC ........... *G02B 5/3075* (2013.01); *G02B 5/208* (2013.01); *G02B 5/3058* (2013.01); *G02F 1/133528* (2013.01); *G02F 2001/133548* (2013.01); *G02F 2201/086* (2013.01)

(58) Field of Classification Search
CPC .......................................... G02F 2001/133548
See application file for complete search history.

(56) References Cited

U.S. PATENT DOCUMENTS

| | | | |
|---|---|---|---|
| 6,288,840 B1 | 9/2001 | Perkins et al. | |
| 7,570,424 B2 | 8/2009 | Perkins et al. | |
| 7,573,546 B2 | 8/2009 | Lee et al. | |
| 7,965,357 B2 | 6/2011 | Van De Witte et al. | |
| 2004/0116013 A1* | 6/2004 | Yoshida | B32B 3/10 442/43 |
| 2004/0213939 A1* | 10/2004 | Hsu | B32B 27/36 428/40.1 |
| 2007/0064446 A1* | 3/2007 | Sharma | G02B 5/0221 362/618 |
| 2009/0133922 A1* | 5/2009 | Okazaki | H05K 9/0096 174/389 |
| 2010/0045924 A1* | 2/2010 | Powers | G02B 5/23 349/190 |

(Continued)

FOREIGN PATENT DOCUMENTS

| | | |
|---|---|---|
| KR | 10-2010-0043938 | 4/2010 |
| KR | 10-2010-0060426 | 6/2010 |
| KR | 10-2011-0062599 | 6/2011 |

*Primary Examiner* — Phu Vu
(74) *Attorney, Agent, or Firm* — H.C. Park & Associates, PLC (57) ABSTRACT

A polarizer includes a base substrate, a polarizing layer disposed on the base substrate and including a plurality of first linear extensions spaced apart from each other, and an ultraviolet (UV)-blocking layer including a plurality of second linear extensions spaced apart from each other and crossing the first linear extensions. The polarizer may block an external UV light.

20 Claims, 10 Drawing Sheets

(56) References Cited

U.S. PATENT DOCUMENTS

| | | |
|---|---|---|
| 2010/0328769 A1 | 12/2010 | Perkins |
| 2012/0008205 A1 | 1/2012 | Perkins et al. |
| 2013/0015482 A1* | 1/2013 | Su .................. H01L 33/507 |
| | | 257/98 |
| 2013/0207911 A1* | 8/2013 | Barton ............... G06F 3/0488 |
| | | 345/173 |
| 2013/0286358 A1* | 10/2013 | Takahashi .......... G02B 5/3058 |
| | | 353/20 |

* cited by examiner

POLARIZER AND DISPLAY PANEL HAVING THE SAME

CROSS-REFERENCE TO RELATED APPLICATION

This application claims priority from and the benefit of Korean Patent Application No. 10-2014-0095963, filed on Jul. 28, 2014, which is hereby incorporated by reference for all purposes as if fully set forth herein.

BACKGROUND

Field

Exemplary embodiments relate to a polarizer. More particularly, exemplary embodiments relate to a wire grid polarizer that may be used for a liquid crystal display apparatus and a display panel including the wire grid polarizer.

Discussion of the Background

A liquid crystal display apparatus applies a voltage to a liquid crystal layer to change arrangement of the liquid crystal layer. Accordingly, optical properties such as a birefringence, an optical rotation, a dichroism, a light scattering or the like are changed to cause a visional change thereby displaying an image.

A liquid crystal display apparatus generally includes a polarizer to control light transmittance. The polarizer may transmit a polarization component parallel to a transmitting axis, and may block a polarization component perpendicular to the transmitting axis.

Examples of the polarizer include an absorbing polarizer and a reflective polarizer. The reflective polarizer reflects a specific polarization component to perform polarization. The reflected polarization component may be reused by a reflective plate of a backlight assembly to increase brightness of a display apparatus. Furthermore, the reflective polarizer may be formed as a wire grid polarizer combined with a display panel to form an in-cell structure.

However, the wire grid polarizer has a greater ultraviolet (UV) light transmittance than the absorbing polarizer. A UV light may affect a liquid crystal layer or a thin film transistor in a liquid crystal display panel to deteriorate their characteristics. Thus, blocking UV light is preferred.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a polarizer capable of improving an optical efficiency and protecting a display panel from external ultraviolet (UV) light.

Exemplary embodiments provide a display panel including the polarizer.

Additional aspects will be set forth in the detailed description which follows, and, in part, will be apparent from the disclosure, or may be learned by practice of the inventive concept.

According to an exemplary embodiment, a polarizer includes a base substrate, a polarizing layer disposed on the base substrate and including a plurality of first linear extensions spaced apart from each other, and an ultraviolet (UV)-blocking layer including a plurality of second linear extensions spaced apart from each other, the first linear extensions crossing the second linear extensions.

According to an exemplary embodiment, a display panel includes a first substrate, a second substrate, and a liquid crystal layer disposed between the first and second substrates. The first substrate includes a base substrate, a polarizing layer disposed on the first base substrate and including a plurality of first linear extensions spaced apart from each other, and a UV-blocking layer including a plurality of second linear extensions spaced apart from each other, the first linear extensions crossing the second linear extensions.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Exemplary embodiments will be described more fully hereinafter with reference to the accompanying drawings, in which various embodiments are shown.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
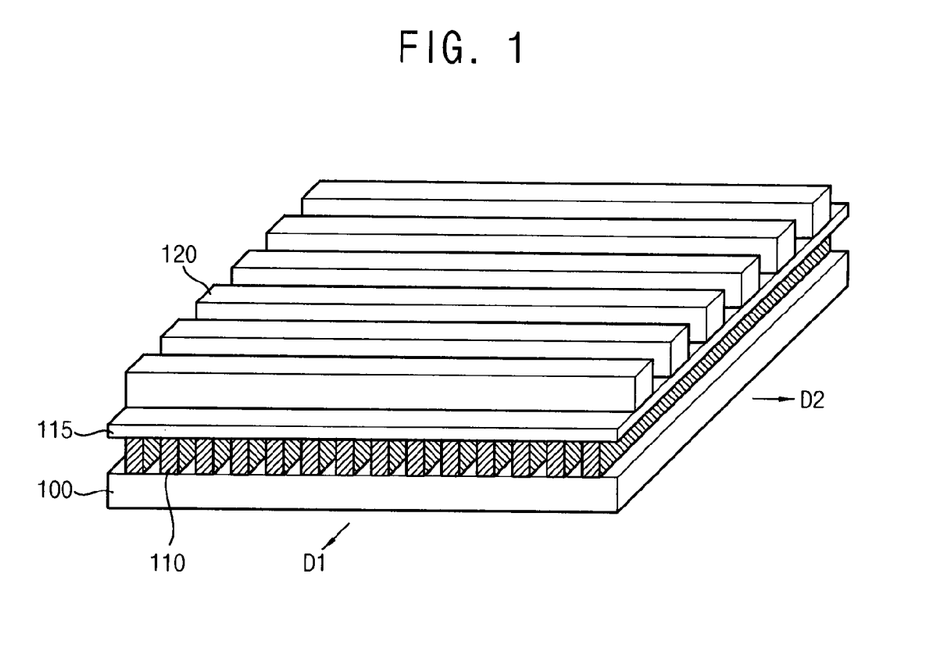
FIG. 1 is a perspective view illustrating a polarizer according to an exemplary embodiment.
Figure 2:
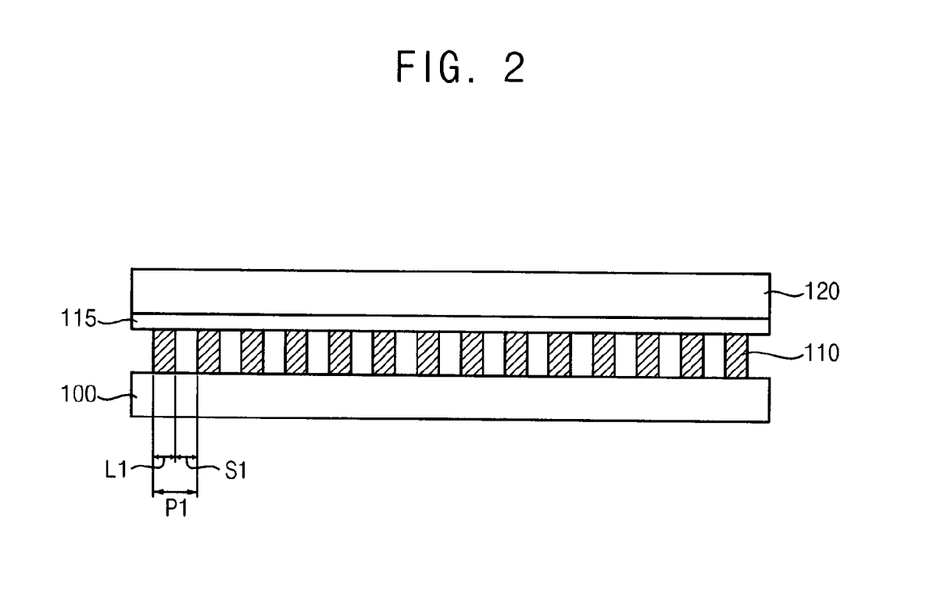
FIG. 2 is a lateral view illustrating the polarizer of FIG. 1 in a first direction.
Figure 3:
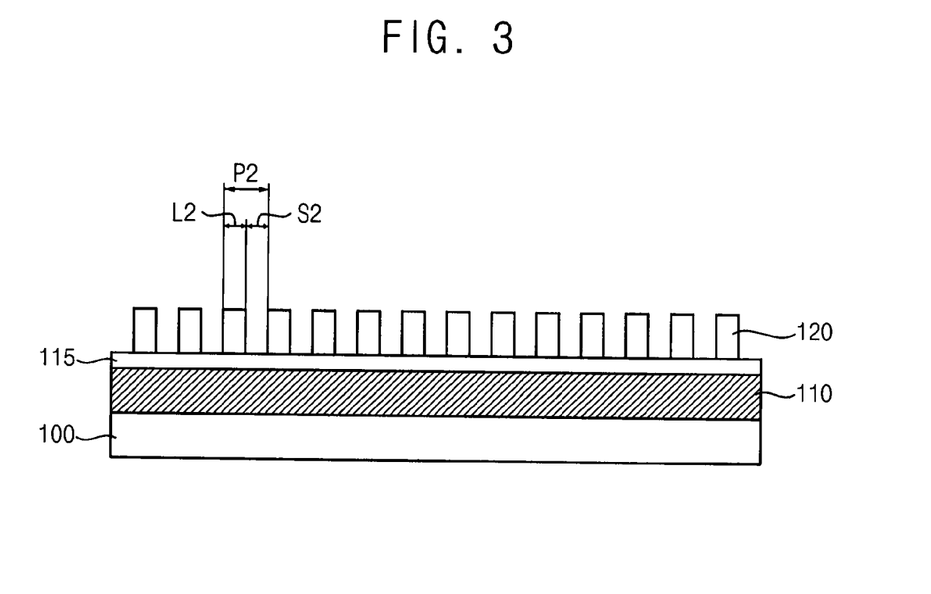
FIG. 3 is a lateral view illustrating the polarizer of FIG. 2 in a second direction.

FIG. 1 is a perspective view illustrating a polarizer according to an exemplary embodiment. FIG. 2 is a lateral view illustrating the polarizer of FIG. 1 in a first direction. FIG. 3 is a lateral view illustrating the polarizer of FIG. 2 in a second direction. FIGS. 4 to 7 are perspective views illustrating polarizers according to exemplary embodiments.

Referring to FIGS. 1 to 3, a polarizer includes a base substrate 100, a polarizing layer including a plurality of first linear extensions 110 spaced apart from each other forming a first pattern, a passivation layer 115, and an ultraviolet (UV)-blocking layer including a plurality of second linear extensions 120 spaced apart from each other, forming a second pattern.

The base substrate 100 may include a material having a high light transmittance, a high heat resistance, a high chemical resistance or the like. For example, the base substrate 100 may include a glass substrate, a quartz substrate, a plastic substrate or the like. Examples of a material that may be used for the plastic substrate may include a polyethylene terephthalate resin, an acryl resin or the like.

The polarizing layer is disposed on the base substrate 100. The first linear extensions 110 extend in a first direction D1, and are spaced apart from each other in a second direction D2, in which the second direction D2 crosses the first direction, to form a wire grid array. The polarizing layer polarizes light passing therethrough. For example, when a light is incident on the polarizing layer, a P wave component parallel to a transmitting axis of the polarizing layer may be transmitted, and an S wave component perpendicular to the transmitting axis of the polarizing layer may be reflected.

The first linear extensions 110 may include a metallic material. For example, the first linear extensions 110 may include, without limitation, aluminum, gold, silver, copper, chrome, iron, nickel or an alloy thereof. These may each be used alone or in combination thereof. In an example, the first linear extensions 110 may include aluminum having a high reflectivity and a high refractivity to a visible light. However, aspects of the invention are not limited thereto, such that the first linear extensions 110 may use other materials having reflective and/or refractive attributes.

Furthermore, the first linear extensions 110 may have a single-layered structure or a multiple-layered structure. For example, the first linear extensions 110 may include a first layer including aluminum, gold, silver, copper, chrome, iron, nickel or an alloy thereof, and may include a second layer including molybdenum or titanium. The second layer including molybdenum or titanium may be disposed on the first layer to protect the first layer during an etching process to form the first linear extensions, which may increase uniformity of extensions.

In an exemplary embodiment, the first linear extensions 110 may include a first layer including aluminum, gold, silver, copper, chrome, iron, nickel or an alloy thereof, and a second layer may include an inorganic insulating material. The second layer including the inorganic insulating material may be disposed on the first layer to be used as a hard mask. For example, the second layer may include materials, such as silicon oxide ($SiO_x$), silicon oxicarbide (SiOC), silicon nitride ($SiN_x$) or the like.

As shown in FIG. 2, a pitch P1 of adjacent first linear extensions 110 may be defined as a sum of a line width L1 of a first linear extension 110 and a spacing distance S1 of adjacent first linear extensions 110.

The pitch P1 may be shorter than a wavelength of an incident light passing through the polarizing layer. For example, when the incident light is a visible light, the pitch P1 may be no more than about 400 nanometer (nm) because a wavelength of the visible light is about 400 nm to about 700 nm. In an example, the pitch P1 may be equal to or less than about 200 nm, ranging from, about 50 nm to about 200 nm.

A transmittance or a reflectivity of the polarizing layer may be adjusted by a ratio of the line width S1 to the pitch P1. In an example, the line width S1 may be equal to or less than about 100 nm, ranging from about 20 nm to about 100 nm.

Further, a thickness of the first linear extensions 110 may be equal to or more than about 100 nm, ranging from about 100 nm to about 300 nm.

The passivation layer 115 is disposed on the polarizing layer. The passivation layer 115 may be formed as a continuous film. The passivation layer 115 may protect the first linear extensions 110. For example, the passivation layer 115 may be formed as a flat thin film spaced entirely apart from the base substrate 100. Thus, an air gap may be formed between adjacent first linear extensions 110. The air gap may increase the reflectivity difference of the polarizer to improve polarizing characteristics.

The passivation layer 115 may include an inorganic insulating material such as silicon oxide ($SiO_x$), silicon oxicarbide (SiOC), silicon nitride ($SiN_x$) or the like. The thickness of the passivation layer 115 may range from about 100 nm to about 1 micrometer (μm). For example, the passivation layer 115 may be formed through a chemical vapor deposition process.

The second linear extensions 120 are disposed on the passivation layer 115. The second linear extensions 120 extend in a direction crossing the direction of the first linear extensions 110. For example, the second linear extensions 120 extend in the second direction D2, and are spaced apart from each other in the first direction D1 perpendicular to the second direction D1 to form a wire grid array.

The second linear extensions 120 may block UV light incident on the polarizer. Since the second linear extensions 120 extend in the direction crossing the first linear extensions 110, the second linear extensions 120 may block or reflect an S wave component of UV light, which may be transmitted by the polarizing layer. Thus, both an S wave component of UV light and a P wave component of UV light may be blocked by the polarizing layer and the UV-blocking layer.

A pitch P2 of adjacent second linear extensions 120 may refer to a sum of a line width L2 of the second linear extensions 120 and a spacing distance S2 of adjacent second linear extensions 120.

The pitch P2 of adjacent second linear extensions 120 may be shorter than a wavelength of a UV light for blocking a UV light. For example, the pitch P2 may be equal to or less than about 200 nm, ranging from about 50 nm to about 200 nm. Furthermore, the line width L2 may be equal to or less than about 100 nm, ranging from about 20 nm to about 100 nm. Furthermore, thickness of the second linear extensions 120 may be equal to or more than about 100 nm, ranging from about 100 nm to about 300 nm.

Figure 4:
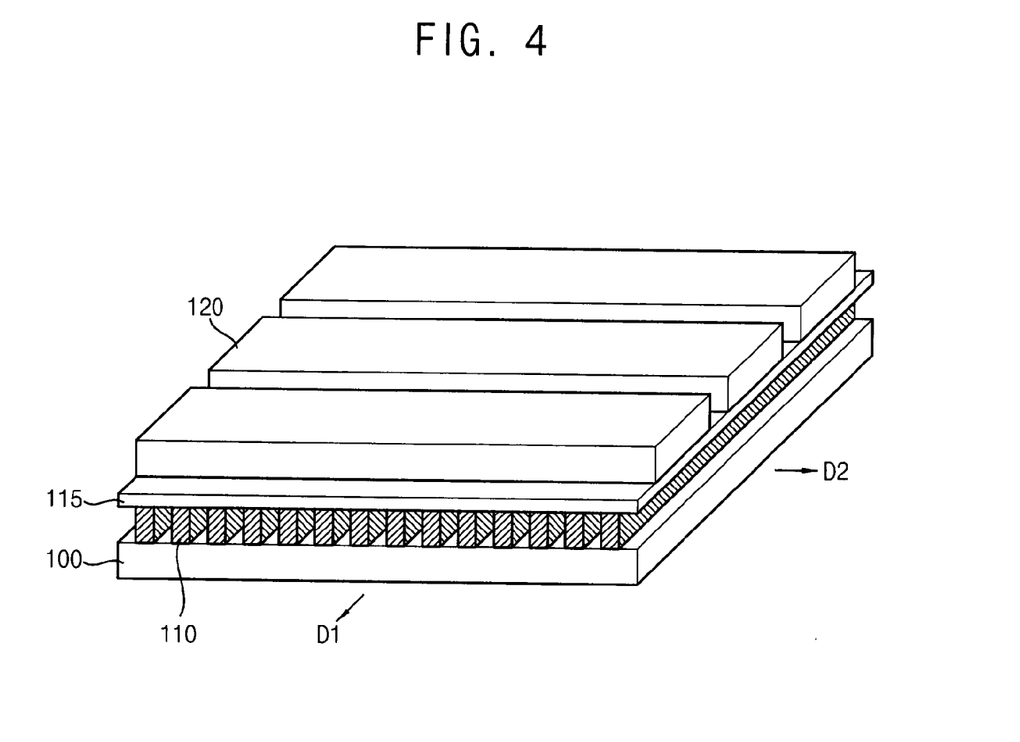
FIGS. 4, 5, 6, and 7 are perspective views illustrating polarizers according to exemplary embodiments.

In an exemplary embodiment, the line width S2 of the second linear extensions 120 may be substantially same as the line width S1 of the first linear extensions 110. In an exemplary embodiment, for example, the line width of the second linear extensions 120 may be greater than the line width of the first linear extensions 110 as illustrated in FIG. 4.

The second linear extensions 120 may include a material having a high transmittance to a visible light and a high UV-blocking ability. For example, the second linear extensions 120 may include a metal oxide. More particularly, the second linear extensions 120 may include titanium oxide ($TiO_2$), zinc oxide (ZnO), an alloy thereof, or the like. In an exemplary embodiment, the second linear extensions 120 may include titanium oxide.

Figure 5:
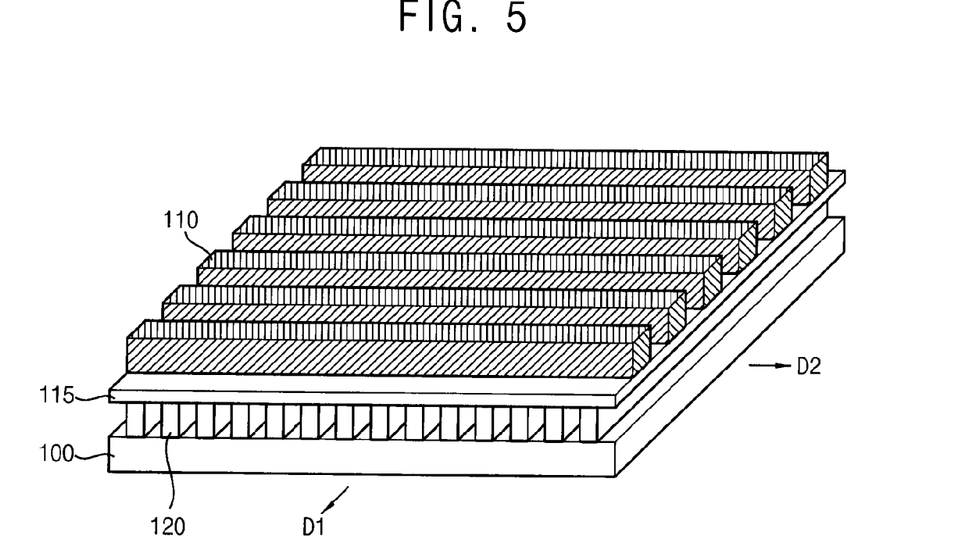

In an exemplary embodiment, the first linear extensions 110 are disposed on the base substrate 100, and the second linear extensions 120 are disposed on the passivation layer 115. However, the order of the first linear extensions 110 and the second linear extensions 120 is not limited thereto and may be changed. For example, the UV-blocking layer including the second linear extensions 120 may be disposed on the base substrate 110, and the polarizing layer including the first linear extensions 110 may be disposed on the passivation layer 115.

Furthermore, according to aspects of the invention, the first linear extensions 110 and the second linear extensions 120 may be respectively disposed on a lower surface and an upper surface of the base substrate 120.

Figure 6:
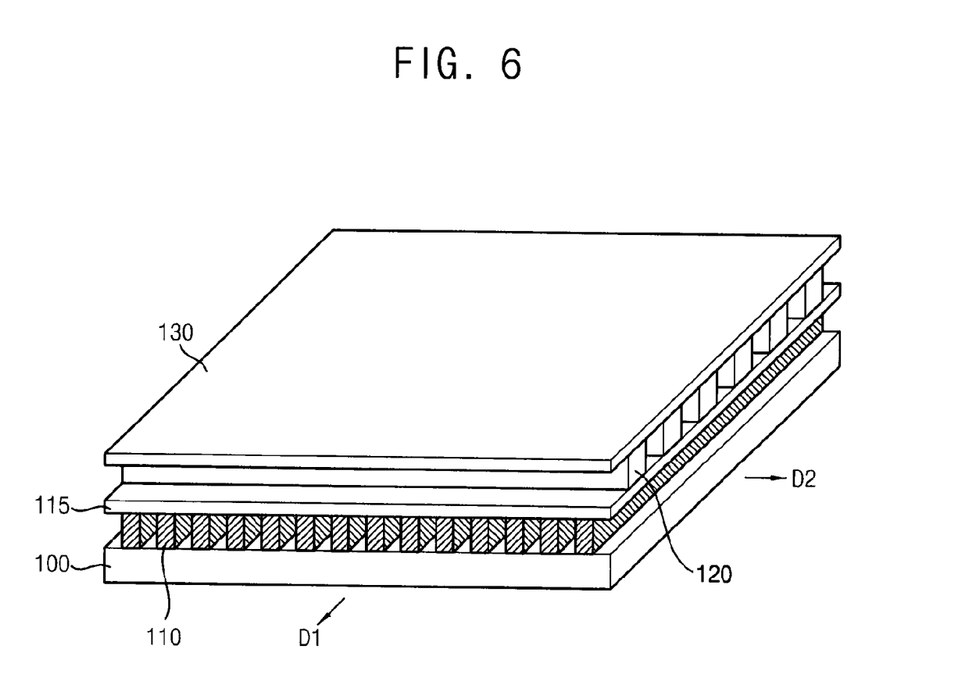

Referring to FIG. 6, a polarizer includes a base substrate 100, a polarizing layer including a plurality of first linear extensions 110 spaced apart from each other, a first passivation layer 115 that covers the polarizing layer, a UV-blocking layer including a plurality of second linear extensions 120 spaced apart from each other, and a second passivation layer 130 that covers the UV-blocking layer.

The second passivation layer 130 protects the second linear extensions 120. The second passivation layer 130 may include the same material as the first passivation layer 115. For example, the second passivation layer 130 may include an inorganic insulating material such as silicon oxide, silicon oxicarbide, silicon nitride or the like.

When the polarizer includes the second passivation layer 130, the second passivation layer 139 may be formed as a flat thin film to be spaced entirely apart from the first passivation layer 115. Thus, an air gap may be formed between adjacent first linear extensions 110.

In exemplary embodiments, the extending direction of the first linear extensions 110 may or may not be substantially perpendicular to the extending direction of the second linear extensions 120.

Figure 7:
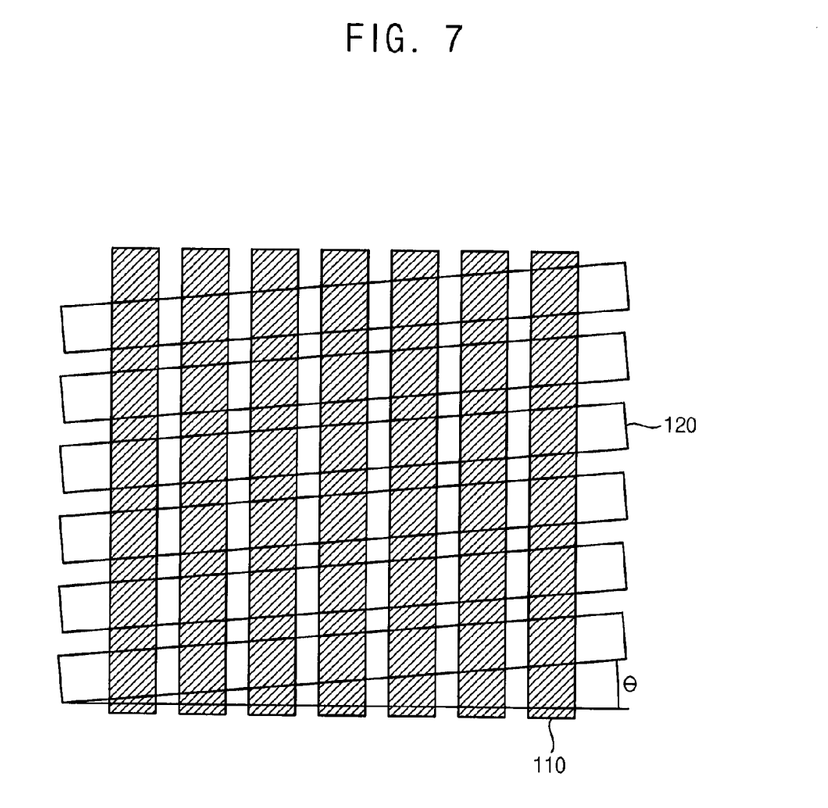

For example, first linear extensions 110 may cross second linear extensions 120 with a crossing angle θ that is greater than 0° and no more than 90° (0°<θ≤90°) as illustrated in FIG. 7.

According to exemplary embodiments, a polarizer includes a polarizing layer and a UV-blocking layer. Thus, the polarizing layer may increase a UV-blocking ability while maintaining transmittance of visible light.

The polarizer may be used alone or may be included in a display panel. For example, the polarizer may share a base substrate with a display panel.

Figure 8A:
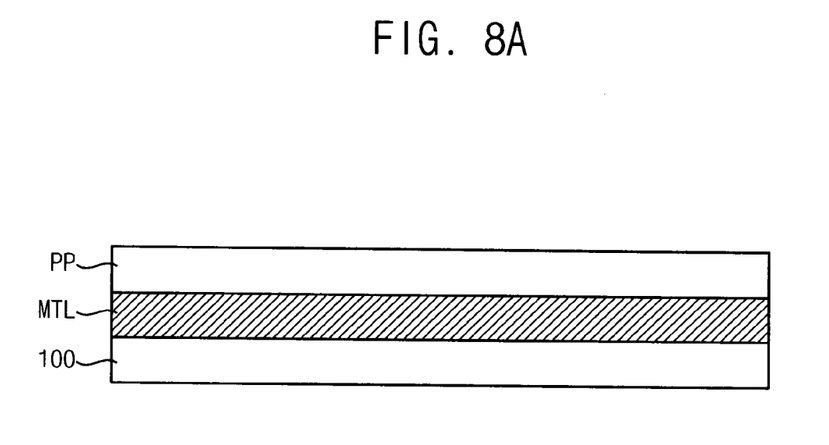
FIGS. 8A, 8B, 8C, 8D, 8E, and 8F are cross-sectional views illustrating a method for manufacturing a polarizer according to an exemplary embodiment.

FIGS. 8A to 8F are cross-sectional views illustrating a method for manufacturing a polarizer according to an exemplary embodiment. Referring to FIG. 8A, a metal layer MTL is disposed on a base substrate 100, and a polymer layer PLL is disposed on the metal layer MTL.

For example, the metal layer MTL may include, without limitation, aluminum, gold, silver, copper, chrome, iron, nickel or an alloy thereof. In an exemplary embodiment, the metal layer MTL may include aluminum having a relatively higher reflectivity.

The metal layer MTL may have a single-layered structure or a multiple-layered structure. For example, the metal layer MTL may include a first layer including aluminum, gold, silver, copper, chrome, iron, nickel or an alloy thereof, and a second layer disposed on the first layer and including molybdenum or titanium. Furthermore, an inorganic insulation layer may be disposed on the metal layer MTL. The inorganic insulation layer may be used as a hard mask in the following patterning process.

The polymer layer PLL may be formed from a photo-curable composition coated on the metal layer MTL. For example, the photo-curable composition may include a binder resin, a monomer, a photo-initiator and a solvent.

Figure 8B:
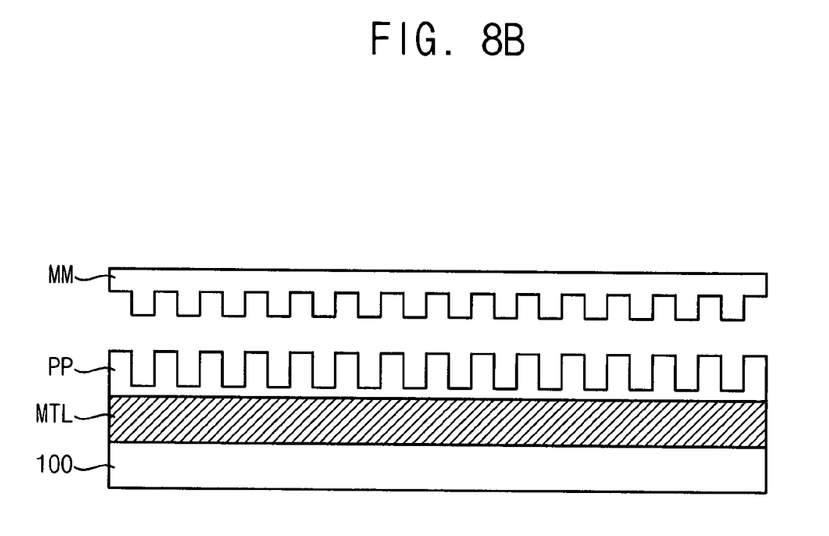

Referring to FIG. 8B, a master mold MM including a wire grid pattern is imprinted on the polymer layer PLL to transcribe the wire grid pattern to the polymer layer PLL. Since the polymer layer before being cured has liquidity, by pressing the master mold MM, the wire grid pattern may be transcribed to the polymer layer PLL. For example, the polymer layer PLL may be exposed to light while the master mold MM is pressed on the polymer layer PLL. After the polymer layer PLL is cured by light, the master mold MM may be separated from the polymer layer PLL. The cured polymer layer PLL may have a convex-concave shape depending on the shape of the master mold MM.

Figure 8C:
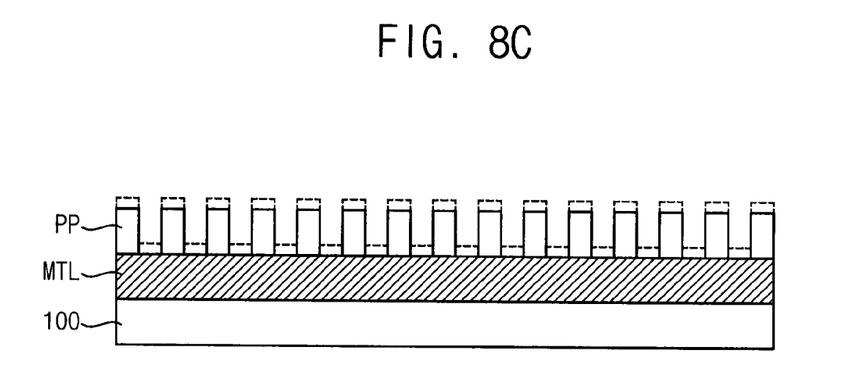

Referring to FIG. 8C, the cured polymer layer PLL is partially removed, for example, by plasma. As the thickness of the polymer layer PLL is reduced, a wire gird pattern including a plurality of polymer extensions forming polymer patterns PP spaced apart from each other may be formed.

As the wire grid pattern is formed, an upper surface of the metal layer MTL, which is not covered by the polymer pattern PP, is exposed.

Figure 8D:
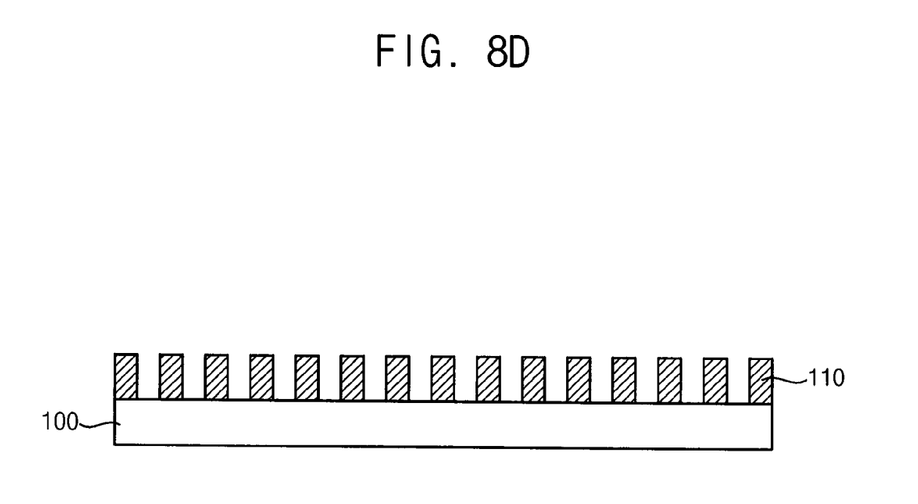

Referring to FIG. 8D, the metal layer MTL may be etched by using the polymer pattern PP as a mask to form a polarizing layer including a plurality of first linear extensions 110 spaced apart from each other.

Figure 8E:
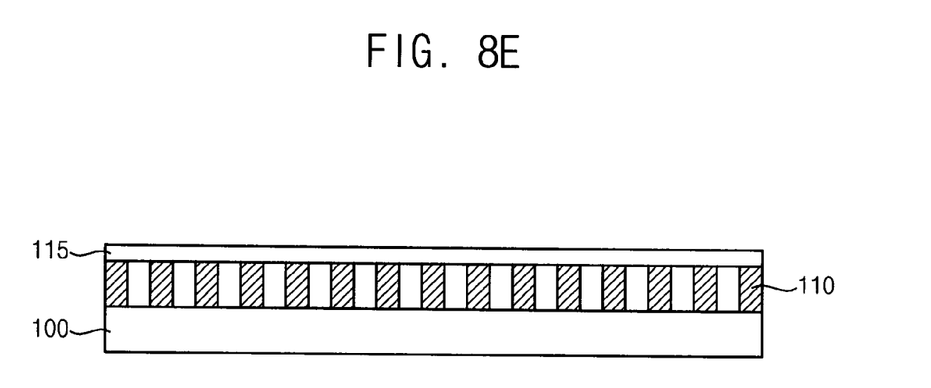

Referring to FIG. 8E, a passivation layer 115 may be formed on the polarizing layer. The passivation layer 115 may be formed through a chemical vapor deposition process. The passivation layer may include an inorganic material such as silicon oxide, silicon oxycarbide, silicon nitride or the like. The passivation layer 115 may be formed as a flat thin film to be spaced entirely apart from the base substrate 100. One or more air gaps may be formed between adjacent first linear extensions 110.

Figure 8F:
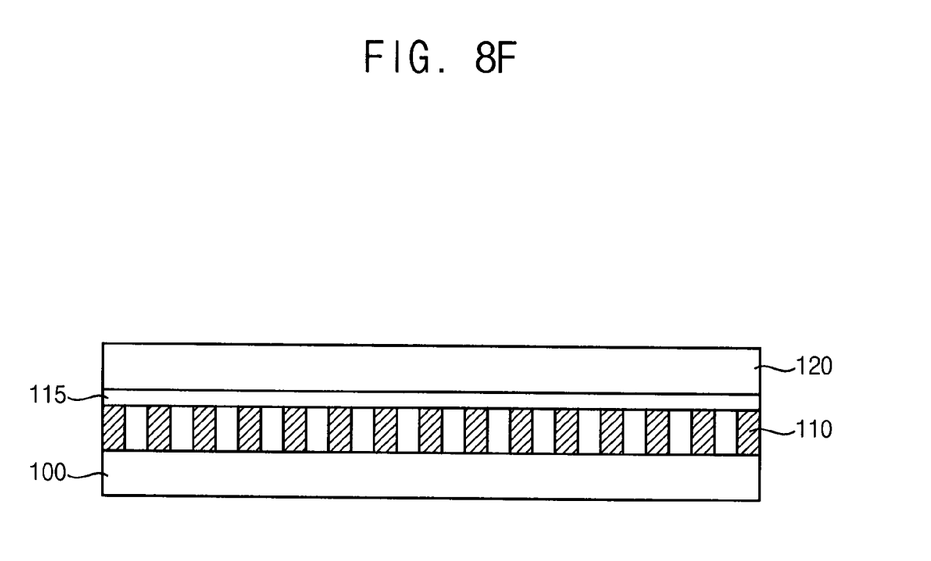

Referring to FIG. 8F, a UV-blocking layer is disposed on the passivation layer 115. The UV-blocking layer includes a plurality of second linear extensions 120 spaced apart from each other. The UV-blocking layer may include, without limitation, titanium oxide. The second linear extensions 120 may extend in a direction crossing the extending direction of the first linear extensions 110. For example, the second linear extensions 120 may extend in a direction perpendicular to the first linear extensions 110.

The UV-blocking layer may be formed through a photo-lithography, a nano-imprinting or the like.

Figure 9:
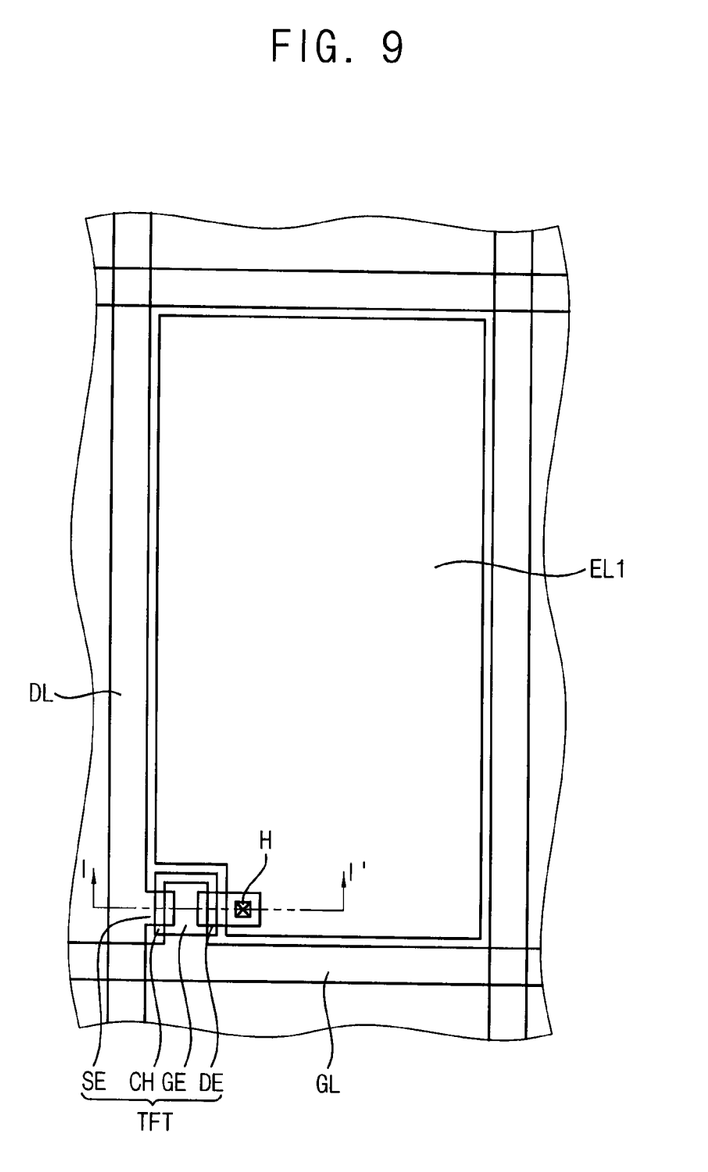
FIG. 9 is a plan view illustrating a display panel according to an exemplary embodiment.
Figure 10:
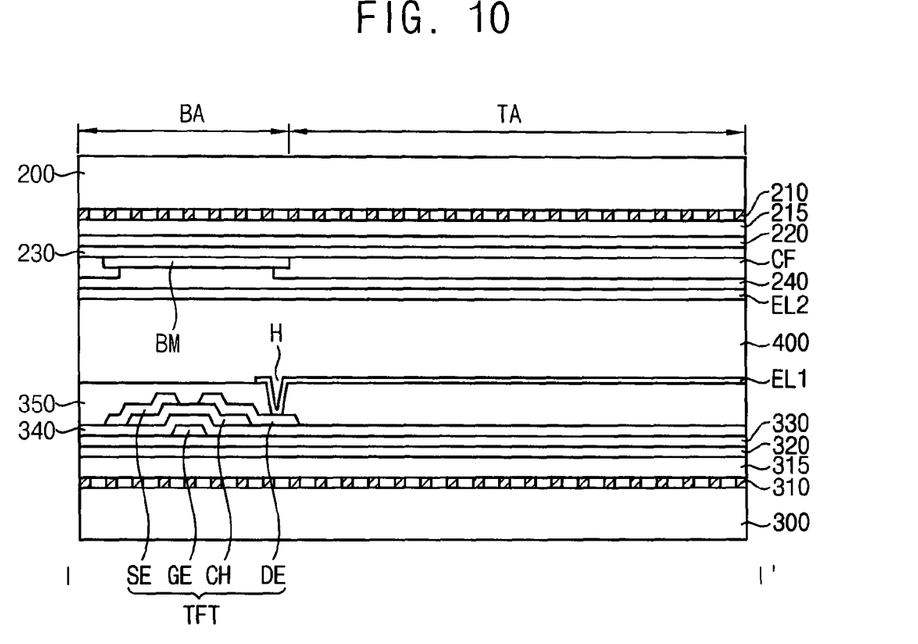
FIG. 10 is a cross-sectional view illustrating the display panel taken along the sectional line I-I' of FIG. 9.
Figure 11:
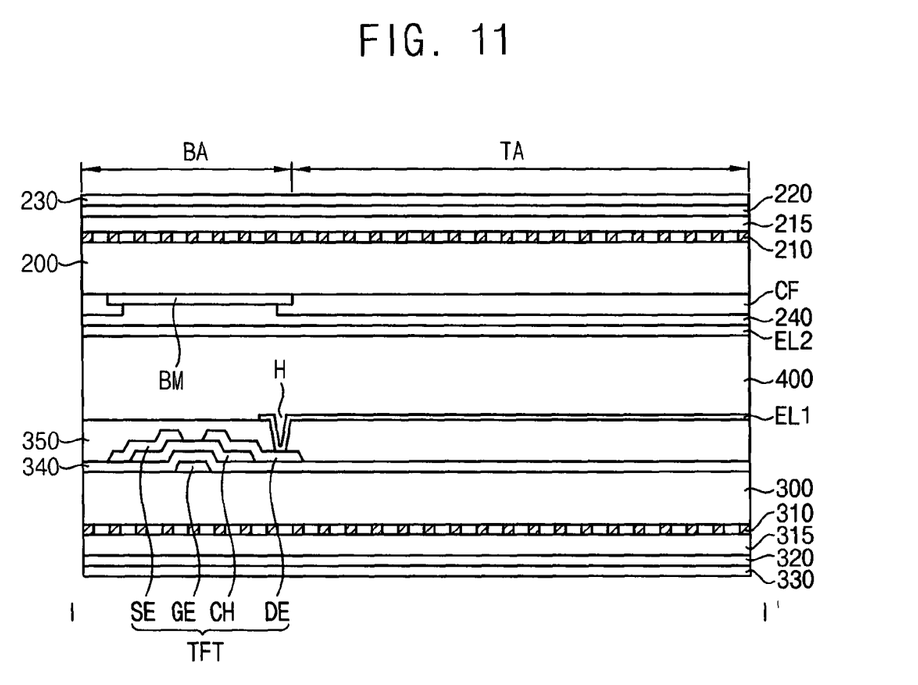
FIG. 11 and FIG. 12 are cross-sectional views illustrating display panels according to exemplary embodiments.
Figure 12:
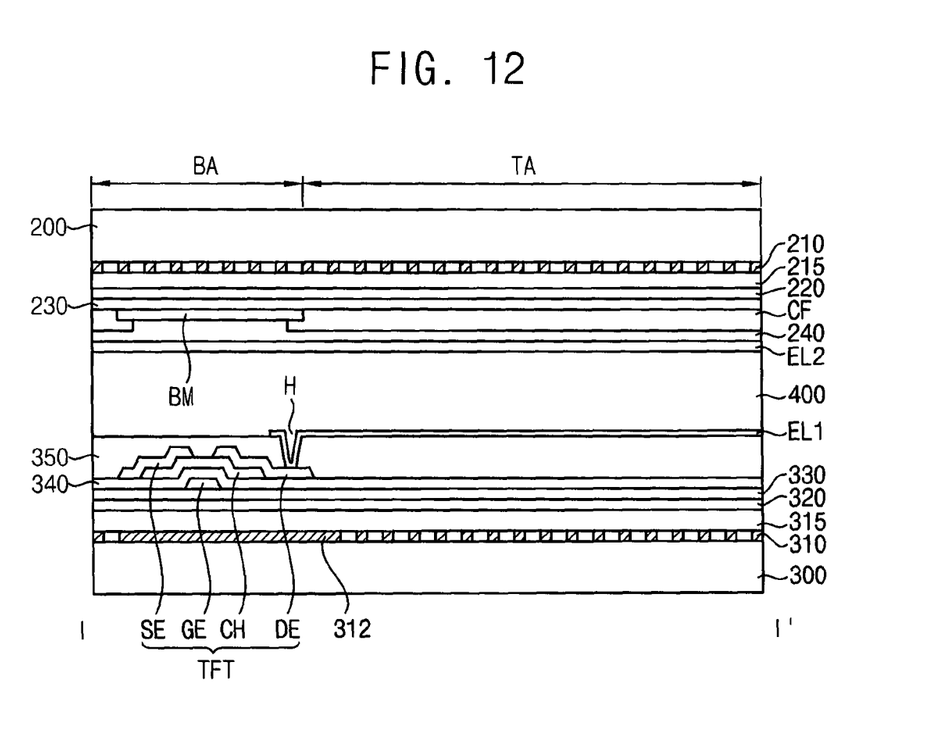

FIG. 9 is a plan view illustrating a display panel according to an exemplary embodiment. FIG. 10 is a cross-sectional view illustrating the display panel taken along sectional line I-I' of FIG. 9. FIG. 11 and FIG. 12 are cross-sectional views illustrating display panels according to exemplary embodiments.

Referring to FIGS. 9 and 10, a display panel includes a first substrate, a second substrate facing the first substrate and a liquid crystal layer 400 interposed between the first and second substrates. Light may be transmitted to the display panel from a backlight assembly disposed under the display pane to display an image.

As shown in FIG. 10, the first substrate may include a first base substrate 200, a first polarizer, a black matrix BM, a color filter CF, an overcoating layer 240, and an opposing electrode EL2.

The first base substrate 200 may include a material having at least one of a high light transmittance, a high heat resistance, a high chemical resistance or the like. For example, the base substrate 100 may include a glass substrate, a quartz substrate, a plastic substrate or the like. Examples of a material that may be used for the plastic substrate include a polyethylene terephthalate resin, an acryl resin or the like.

The first polarizer is disposed between the first base substrate 200 and the color filter CF. The first polarizer may include a polarizing layer including a plurality of first linear extensions 210 spaced apart from each other, a first passivation layer 215 that covers the polarizing layer, a UV-blocking layer including a plurality of second linear extensions 220 spaced apart from each other, and a second passivation layer 230 that covers the UV-blocking layer.

The first linear extensions 210 extend in a first direction, and are spaced apart from each other in a second direction perpendicular to the first direction to form a wire grid array. The first linear extensions 210 may include a metal and may have a single-layered structure or a multiple-layered structure.

The first passivation layer 215 is interposed between the polarizing layer and the UV-blocking layer, and may be formed as a continuous film. The first passivation layer 215 may be formed as a flat thin film spaced entirely apart from the base substrate 200. Thus, an air gap may be formed between adjacent first linear extensions 210. The passivation layer 115 may include an inorganic insulating material such as silicon oxide, silicon oxycarbide, silicon nitride or the like.

The second linear extensions 220 are disposed between the first passivation layer 215 and the second passivation layer 230. The second linear extensions 220 extend in a direction crossing the extending direction of the first linear extensions 210. For example, the second linear extensions 220 extend in the second direction and are spaced apart from each other in the first direction to form a wire grid array.

The second linear extensions 220 may block a UV light incident on the polarizer. The second linear extensions 220 may include a metal oxide having a high UV-blocking ability. For example, the second linear extensions 220 include titanium oxide, zinc oxide or the like. Since the second linear extensions 220 extend in the direction crossing the first linear extensions 210, the second linear extensions 220 may block or reflect an S wave component of a UV light, which may be transmitted by the polarizing layer. Accordingly, both an S wave component of a UV light and a P wave component of a UV light may be blocked by the polarizing layer and the UV-blocking layer. Thus, the polarizer may protect the display panel from external UV light.

The black matrix BM is disposed under the second passivation layer 230. An area overlapped by the black matrix BM may be referred to as a light-blocking area BA. The black matrix BM may overlap with at least one of a data line DL, a gate line GL, or a thin film transistor TFT of the second substrate.

The color filter CF is disposed under the second passivation layer 230. An area overlapping with the color filter CF may be defined as a light-transmitting area TA. The color filter CF may partially overlap with the black matrix BM.

The color filter CF may include a red color filter, a green color filter, and a blue color filter. The color filter CF is provided for each pixel. Adjacent pixels may include different color filters. Adjacent color filters may partially overlap one other, or may be spaced apart from each other.

The overcoating layer 240 covers the color filter CF and the black matrix BM and may flatten the substrate.

The opposing electrode EL2 is disposed under the overcoating layer 240. The opposing electrode EL2 may continuously cover the light-transmitting area TA and the light-blocking area BA. The opposing electrode EL2 may have an opening. The opposing electrode EL2 may include, without limitation, a transparent conductive material. For example, the opposing electrode EL2 may include indium tin oxide (TIO), indium zinc oxide (IZO), or the like.

At least one of the opposing electrode EL2, the color filter CF, and the black matrix BM may be disposed on the second substrate including an array of a thin film transistor.

The second substrate may include a second base substrate 200, a second polarizer, a thin film transistor TFT, a first insulation layer 340, a second insulation layer 350, and a pixel electrode EL1.

The second polarizer may be disposed between the second base substrate 300 and the first insulation layer 340. The second polarizer may be substantially the same as the first polarizer. For example, the second polarizer may include a polarizing layer including a plurality of third linear extensions 310 spaced apart from each other, a third passivation layer 315 that covers the polarizing layer, a UV-blocking layer including a plurality of fourth linear extensions 320 spaced apart from each other, and a second passivation layer 330 that covers the UV-blocking layer.

The third linear extensions 310 may extend in a direction parallel to or perpendicular to the extending direction of the first linear extensions 210 depending on the alignment mode of the liquid crystal layer. The fourth linear extensions 320 extend in a direction crossing the extending direction of the third linear extensions 310.

The second polarizer may be substantially same as the first polarizer. Thus, any duplicative explanations may be omitted.

The second substrate may include a thin film transistor array. A thin film transistor TFT may include a source electrode SE, a gate electrode GE, a channel CH and a drain electrode DE. The thin film transistor TFT is electrically connected to a gate line GL and a data line DL.

The gate line GL and the gate electrode GE are disposed on the fourth passivation layer 330. The gate electrode GE is electrically connected to the gate line GL.

The gate line GL and the gate electrode GE are covered by the first insulation layer 340. The first insulation layer 340 may include an inorganic insulation material such as silicon nitride, silicon oxide or the like.

The channel CH is disposed on the first insulation layer 340 and overlaps with the gate electrode GE. The channel CH may include amorphous silicon, polycrystalline silicon, oxide semiconductor or the like.

The data line DL is disposed on the first insulation layer 340, and crosses the gate line GL.

The source electrode SE and the drain electrode DE are disposed on the channel CH. The source electrode SE is electrically connected to the data line DL, and spaced apart from the drain electrode DE. The drain electrode DE passes through the second insulation layer 350 to be electrically connected to the pixel electrode EL1.

The second insulation layer 350 is disposed on the first insulation layer 340, and covers the thin film transistor TFT. The second insulation layer 350 may include an inorganic insulation material such as silicon nitride, silicon oxide or the like. In an exemplary embodiment, the second insulation layer 350 may include an organic insulation material having a low permittivity. Furthermore, the second insulation layer 350 may have a double-layered structure including an inorganic insulation layer and an organic insulation layer. The drain electrode DE is connected to the pixel electrode EU through a contact hole H passing through the second insulation layer 350.

The pixel electrode EL1 is disposed on the second insulation layer 350. The pixel electrode EL1 may include a transparent conductive material. For example, the pixel electrode EL1 may include indium tin oxide, indium zinc oxide or the like.

The liquid crystal layer 400 may be disposed between the first substrate and the second substrate. The liquid crystal layer 400 includes liquid crystal molecules having optical anisotropy. The liquid crystal molecules are aligned by an electric field thereby transmitting or blocking light to display an image.

The second polarizer may block UV light exiting from a backlight unit.

According to an exemplary embodiment, a display panel includes a wire grid polarizing layer and a wire grid UV-blocking layer crossing the polarizing layer. Thus, external UV light may be effectively blocked.

In an exemplary embodiment, the first polarizer is disposed on an inner surface of the first base substrate 200, and the second polarizer is disposed on an inner surface of the second base substrate 300. However, the first polarizer and the second polarizer may be disposed on an outer surface of the first base substrate 200 and an outer surface of the second base substrate 300.

Referring to FIG. 12, a second polarizer may further include a reflective pattern 312. The reflective pattern 312 may be disposed in a same layer as a polarizing layer including a plurality of third linear extensions 310.

The reflective pattern 312 may have a greater width than the third linear extensions 310. The reflective pattern 312 is disposed under the thin film transistor TFT to overlap with the thin film transistor TFT. Furthermore, the reflective pattern 312 may overlap partially or entirely with the black matrix BM.

The reflective pattern 312 may be disposed on the same layer as the polarizing layer. Thus, the reflective pattern 312 may include a same material as the polarizing layer. For example, the reflective pattern 312 may include, without limitation, aluminum, gold, silver, copper, chromium, iron, nickel or an alloy thereof.

The reflective pattern 312 reflects light provided to the light-blocking area BA from the backlight unit. The reflected light is reflected by a reflective member of the backlight unit. Thus, the reflected light may be provided to the display panel and may be transmitted through the light-transmitting area TA. Accordingly, light may be reused to increase a brightness of the display panel.

Furthermore, the reflective pattern 312 may prevent or reduce amount of UV light from entering the channel CH of the thin film transistor TFT. Thus, deterioration of the thin film transistor may be reduced or prevented.

In an exemplary embodiment, a polarizer may be employed in a liquid crystal display panel. However, aspects of the invention are not limited thereto, such that the polarizer may be employed in various display devices and optical devices, which may include a polarizer such as an organic electroluminescent panel.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A polarizer comprising:
    a base substrate;

a polarizing layer disposed on the base substrate, the polarizing layer comprising a plurality of first linear extensions spaced apart from each other and extending in a first direction; and a ultraviolet (UV)-blocking layer comprising a plurality of second linear extensions spaced apart from each other and extending in a second direction thereby defining a gap extending in the second direction between the second linear patterns, the second direction crossing the first direction, wherein the first linear extensions cross the second linear extensions.

2. The polarizer of claim 1, further comprising a first passivation layer interposed between the polarizing layer and the UV-blocking layer.

3. The polarizer of claim 2, wherein the first passivation layer comprises at least one of silicon oxide, silicon oxycarbide, and silicon nitride.

4. The polarizer of claim 2, further comprising a second passivation layer configured to cover the polarizing layer or the UV-blocking layer.

5. The polarizer of claim 1, wherein the first linear extension comprises at least one of aluminum, gold, silver, copper, chromium, iron, and nickel.

6. The polarizer of claim 1, wherein the second linear extension comprises a metal oxide.

7. The polarizer of claim 6, wherein the metal oxide includes at least one of titanium oxide and zinc oxide.

8. The polarizer of claim 1, wherein the polarizing layer is disposed between the base substrate and the UV-blocking layer.

9. The polarizer of claim 1, wherein the UV-blocking layer is disposed between the base substrate and the polarizing layer.

10. The polarizer of claim 1, wherein a pitch between the first linear extensions and a pitch between the second linear extensions are equal to or less than about 200 nanometer (nm).

11. The polarizer of claim 1, further comprising an air gap between the first linear extensions.

12. The polarizer of claim 1, further comprising a reflective pattern disposed on the same layer as the polarizing layer, the reflective pattern having a width greater than one of the first linear extensions.

13. A display panel comprising:
a first substrate comprising:
a first base substrate;
a polarizing layer disposed on the first base substrate, the polarizing layer comprising a plurality of first linear extensions spaced apart from each other and extending in a first direction; and a ultraviolet (UV)-blocking layer comprising a plurality of second linear extensions spaced apart from each other and extending in a second direction thereby defining a gap extending in the second direction between the second linear patterns, the second direction crossing the first direction, wherein the first linear pattern extensions cross the second linear extensions;

a second substrate; and a liquid crystal layer disposed between the first substrate and the second substrate.

14. The display panel of claim 13, wherein the second substrate comprises:
a second base substrate;
a polarizing layer disposed on the second base substrate, the polarizing layer comprising a plurality of third linear extensions spaced apart from each other; and
a UV-blocking layer comprising a plurality of fourth linear extensions spaced apart from each other,
wherein the third linear extensions cross the fourth linear extensions.

15. The display panel of claim 14, wherein the second substrate further comprises a reflective pattern disposed on the same layer as the polarizing layer, the reflective pattern having a width greater than one of the third linear extensions.

16. The display panel of claim 15, wherein the second substrate further comprises a thin film transistor and a pixel electrode electrically connected to the thin film transistor,
wherein the reflective pattern overlaps with the thin film transistor, and the first linear patterns overlap with the pixel electrode.

17. The display panel of claim 13, wherein the first substrate further comprises a passivation layer disposed between the polarizing layer and the UV-blocking layer.

18. The display panel of claim 13, wherein the first linear extension comprises at least one of aluminum, gold, silver, copper, chromium, iron, and nickel.

19. The display panel of claim 13, wherein the second linear extension comprises titanium oxide or zinc oxide.

20. The display panel of claim 13, wherein the first substrate comprises an air gap between the first linear extensions.

* * * * *